United States Patent [19]
Volat et al.

[11] 3,993,358
[45] Nov. 23, 1976

[54] SWITCHING DEVICE FOR A CONVEYOR OF LETTERS, CARDS OR OTHER THIN ARTICLES

[75] Inventors: Jean-Pierre Volat, Aix-en-Provence; Jean-Louis Elie Pichon, Marseille, both of France

[73] Assignee: Bertin & Cie, Plaisir, France

[22] Filed: June 11, 1975

[21] Appl. No.: 585,884

[30] Foreign Application Priority Data
June 11, 1974  France .............................. 74.20108

[52] U.S. Cl. ................................. 302/2 R; 271/64; 271/195; 302/28; 302/29
[51] Int. Cl.² ........................................ B65G 51/02
[58] Field of Search ............... 302/2 R, 29, 31, 28; 193/31, 36, 39; 198/DIG. 16; 271/64, 194, 195, 196, 197; 209/74 R, 74 M

[56] References Cited
UNITED STATES PATENTS

| | | | |
|---|---|---|---|
| 2,881,000 | 4/1959 | Kephart | 271/195 X |
| 3,243,181 | 3/1966 | Lyman | 271/64 |
| 3,472,506 | 10/1969 | Rabinow et al. | 271/64 |
| 3,659,840 | 5/1972 | Ruck | 271/64 |

*Primary Examiner*—Evon C. Blunk
*Assistant Examiner*—James L. Rowland
*Attorney, Agent, or Firm*—A. W. Breiner

[57] ABSTRACT

Letters or like thin articles moving flat over a horizontal conveyor track are to be switched selectively towards either track of a fork. Such switching is controlled by intermittent pneumatically operating actuator means acting in the region of a gap in the track at the end of an incoming section, in order to deflect the articles away from their horizontal path and downwardly, these means cooperating with a physical surface which is inclined relatively to this path and towards which the articles are swung under the pneumatic action. This surface is composed of a stationary plate having a slanting operative face exposed to said pneumatically operating actuator means.

The device is useful for the automatic postal sorting of letters.

6 Claims, 6 Drawing Figures

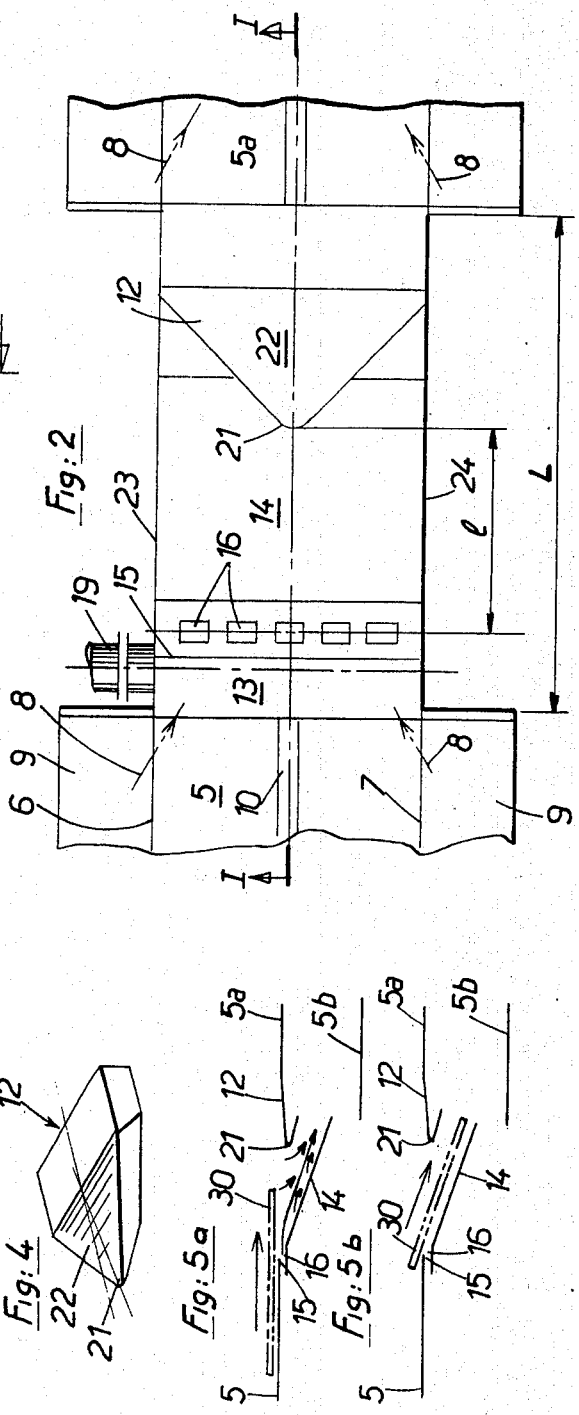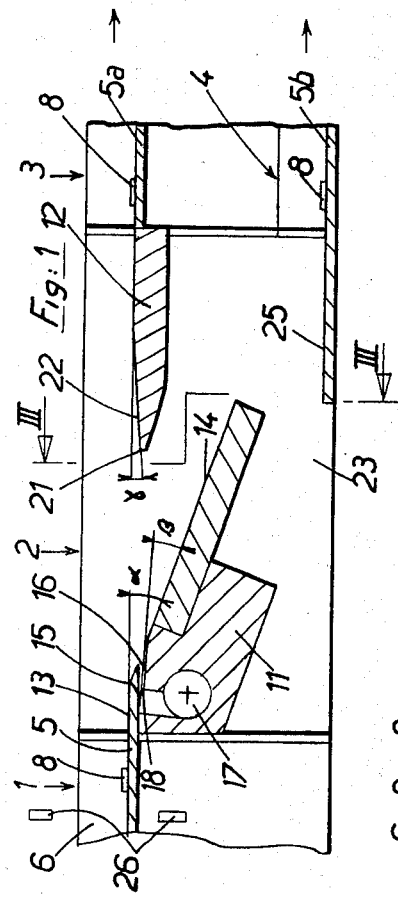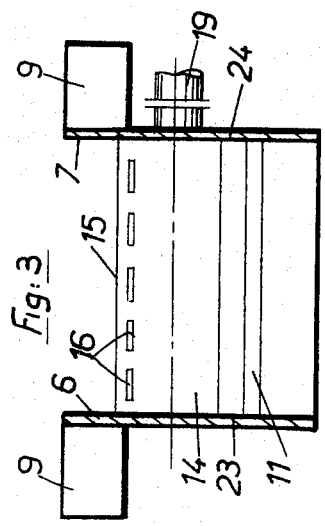

SWITCHING DEVICE FOR A CONVEYOR OF LETTERS, CARDS OR OTHER THIN ARTICLES

The present invention relates to the handling of thin articles such as letters or postal covers, checks, statements, punched cards or other pieces of like outline of paper, plastic material or metal, moving flat over an adequate conveyor. Its object is more specifically to switch selectively the conveyed articles towards either track of a fork, in order to carry out, say, the sorting of these thin articles.

Such an operation — which is already by itself delicate when dealing, as in postal sorting, with articles of widely varying size and weight, becomes increasingly difficult when the traffic of the articles to be sorted takes place at large speed and at high rate (in postal sorting, motion speeds of a few meters per second and rates of the order of some ten letters per second are witnessed). It is indeed important to avoid any clogging of the conveyor track and to this effect to clear the latter very quickly in the region of each sorting device also named switch, while implies for the latter an operation without the least ambiguity and at very low inertia, and the possibility of exerting on the articles to be sorted powerful control pulses of very marked discontinuity, i.e., with steep leading and trailing fronts. In brief, a practically imperative condition which the switching device must meet is not to constitute a bottleneck and therefore to stand the speeds and rates of the conveyor feeding it, while offering a great operative safety in order never to "derail" with the consequence of blocking the fork by an article which would get jammed in it.

The switching device of the present invention, while applicable to any conveyor having a substantially horizontal transportation track section over which the thin articles to be sorted move flat, appears to be of conspicuous interest in the area of a "fluidic" conveyor of the kind described in our copending application Ser. No. 585,883 filed of even date and entitled "Conveyor device for letters, cards or other thin articles." It can furthermore be associated with any device for collecting the sorted articles.

The switching device according to the present invention comprises intermittent pneumatically operating means acting in the region of a gap or break in the transportation track, in order to deflect away from their rectilinear path, preferably downwards, thin articles moving flat, these pneumatically operating means cooperating with a physical surface inclined with respect to said path and towards which the articles are swung under said pneumatic action; this physical surface may be constituted by a stationary plate having an inclined operative face exposed to said pneumatically operating means.

This switching device is conveniently fitted at the end of a more or less horizontal track section from which the thin articles to be sorted arrive and which is separated, by the said gap, from a first collecting element belonging to a fork and located at substantially the same level, whereas a second collecting element of this fork is shifted to a clearly lower level towards which said plate slants.

In an embodiment of the present invention, said slanting physical surface is connected to said arrival track section by an edge or the like substantiating the virtual axis about which the articles are swung, while said intermittent pneumatically acting means comprise one or more nozzles opening beyond said connecting edge though in its vicinity in order to deliver pressure fluid jets in the direction of motion of the articles and beneath them. These jets will preferably be, if not parallel, at any rate slightly inclined with respect to said arrival track section and therefore at a substantial angle to said slanting physical surface.

In accordance with an advantageous technical feature of the present invention, said first collecting element of the fork presents a fore end part which tapers towards the arrival track section located substantially at its level, this ramp conformation being suitable to ricochet in one direction or the other the articles which would impinge it. This tapering end part can have the general shape of a pyramid with rounded edges and blunted vertex, acting as a sort of deflecting stem with respect to the articles which would impinge it. A face of said pyramid is more or less in extension of said arrival track section and conveniently makes with it a slight angle of inclination towards said plate.

In the accompanying drawings:

FIG. 1 is a vertical longitudinal section taken along line I—I of FIG. 2, showing an embodiment of switching device according to the present invention.

FIG. 2 is a plan view of the switching device.

FIG. 3 is a vertical cross-section taken along line III—III of FIG. 1.

FIG. 4 is a perspective view of a structural detail.

FIG. 5a and 5b are explanatory diagrams of the aerodynamic operation of the device.

In FIGS. 1 to 3 is shown an arrival track section 1 connected through a switching system 2 to a fork made of two departure tracks or collecting elements 3 and 4. The arrival track 1 and both departure tracks 3 and 4 are of fluidic type, being for instance designed as described in the aforementioned patent application. It will be briefly recalled that such a track, of U-shaped cross-section, comprises a substantially planar, smooth and horizontal supporting surface 5 and two substantially vertical side extensions 6 and 7. Blowing orifices 8 are formed in the walls 6 and 7 so as to open flush with the supporting surface 5. They are oriented towards the center line of the track, though inclined in the direction of progression. Along the axis of the track, a slot 10 is formed in the supporting surface 5 in order to allow discharge of fluid to the atmosphere. Two manifolds 9 associated with the walls 6 and 7 supply pressure fluid to orifices 8. It is, however, obvious that switching system 2 may be associated with types of track other than the above.

This switching system 2 basically comprises, in accordance with the present invention, a deflector unit 11 and a shaped piece 12 ensuring a physical separation between the two departure tracks 3 and 4. The deflector unit 11 is constituted by a body presenting two substantially planar surfaces 13 and 14 making between them a notable angle $\alpha$ and connected to each other by a sharp edge 15 or the like. Surface 13 constitutes an arrival track section positioned as an extension of the substantially horizontal supporting surface 5 of track 1, surface 14 being preferably slanting downwards.

Downstream of edge 15 and in its vicinity, orifices 16 of a plurality of nozzles lined up parallel to edge 15, open out on surface 14. These orifices are preferably elongated in their alinement direction, being, for instance, of generally rectangular shape. They are supplied from a manifold 17 housed in the body of the deflector, through ducts 18 oriented so that their axis is at a notable angle $\beta$ with surface 14. Preferably the ducts are slightly inclined with respect to section 13 ($\beta$ slightly smaller than $\alpha$) or even parallel thereto ($\beta = \alpha$). Manifold 17 is itself fed with air at high pressure from a pipe 19.

The shaped partitioning piece 12 is fitted downstream of the deflector unit 11. Its end 21 pointing upstream has the general shape of a pyramid whose edges are rounded and whose vertex is blunted. One of its faces 22 which extends rearwardly in a horizontal plane is positioned substantially at the same level as section 13 of the deflector unit but may conveniently be slightly inclined upstream and downwards by an angle $\gamma$ to said section 13.

The deflector unit 11 and the partitioning piece 12 are carried by uprights 23, 24 straight below the side walls 6 and 7 of tracks 1, 3 and 4. Thus are avoided the lateral deflections of letters during their passage through the switch.

Supporting surface 5a of the departure track 3 is located as an extension of surface 22 of body 12. Supporting surface 5b of the departure track 4 is itself located slightly downstream of and below slanting surface 14 of the deflector unit 11. If useful, it can be extended by a substantially horizontal planar surface 25 fitted between the uprights 23, 24.

Lastly a photoelectric unit 26 or other system for sensing letters arriving on track 1 to switch 2, is arranged upstream of it.

The operation of the switch is as follows:

In the absence of control, i.e., in the absence of blowing from orifices 16, a letter arriving from track 1 passes over section 13 and, due to the momentum it has gathered, flies over the switch gap, to be recovered by surface 22 which leads it to track 3. It is to be noted that fluid ejected in the direction of motion of the letters through orifices 8 of track 1, tends to flow over section 13 and to be recovered by surface 22, especially if the latter has a slight slant $\gamma$, as stated above. In practice, a letter will remain borne on a fluid layer both on section 13 and on surface 22. The passage of the letter through the switch will therefore cause no notable slowing down of the letter. On the other hand (see FIG. 4), the general pyramid shape of end 21 avoids any risk of jamming of a letter presenting itself in incorrect position. For instance, if a letter, instead of being horizontal is inclined sideways, it will encounter one of the receding rounded edges of the pyramid and will slide along it until it comes to a proper position. In no case will there be any blocking of the letter, even though engagement takes place at the vertex of the pyramid, since it is blunted.

If an arriving letter is to be deflected, blowing of fluid by orifices 16 is actuated. The fluid jets delivered at an important angle $\beta$ to wall 14 do not tend to adhere immediately to its surface. So the letter arriving upon edge 15 is not yet deflected and moves on straight. A volume is thus confined between letter 30, edge 15 and wall 14 (see FIG. 5a). Inside this volume, the plurality of jets delivered at high pressure by orifices 16 have an inducing effect on the air therein. This effect is enhanced inasmuch as each element jet is completely surrounded by ambient air. This results almost immediately in a strong vacuum which on the one hand attracts and urges downward letter 30 which then swings about a virtual axis substantiated by edge 15 (FIG. 5b) and on the other hand causes the jets to swing and stick to wall 14. Letter 30 whose speed was substantially increased under the jets moves then on while being guided by wall 14 and is received by wall 25 and thereafter by track 4.

The control of blowing by orifices 16 is ensured by the letter sensor 26. For instance, the beginning of the passage of a letter in front of the sensor can trigger the blowing. The end of the blowing can be controlled after a predetermined lapse of time or else by the passage of the trailing edge of the letter in front of sensor 26. The strength of the deflecting forces developed in switch 2 causes a quick swinging of letters 30, allowing reduction of the overall length L of the switching device, as well as of the length l between vertex 21 of shaped piece 12 and blowing orifices 16. Now, as soon as the leading edge of the letter has overreached vertex 21, switching of this letter has become irreversible; control in view of switching the following letter can therefore be initiated. Reduction of length l along with the fact that the letters moving past the switch are not slowed down or are even accelerated, allows operation at very high rates.

This switch 2 presents furthermore numerous other qualities among which may be cited:
 no movable part is used,
 use of high-pressure fluid to cause deflection allows quick switchings,
 risks of damaging the transported articles are reduced due to the almost permanent interposition of pressure fluid layers.

In a practical example, the following figures have been noted:

| | |
|---|---|
| speed of letters | = 3–4 ms./sec. |
| rate | = 10 letters/second |
| L | = 70 mms. |
| l | = 50 mms. |
| $\alpha$ | = 24–30° |
| $\alpha - \beta$ | = 0 to a few degrees |
| $\gamma$ | = 0 to a few degrees. |

It is not compulsory that switch 2 be only used with conveyor tracks on fluidic type; it may just as well be associated with other kinds of tracks, notably those calling upon a mechanical conveyor system. Moreover, in the described embodiment, the deflected letters are fed to a departure track 4. It is obvious that the collecting member could also be constituted by a rack for storing and piling up letters.

We claim:
1. Device for switching thin articles which move flat in succession after each other over a conveyor track leading to a delivering end section which is separated by a gap from (i) a first collecting section extending generally level with said delivering section and adapted to receive undeflected articles flying by their momentum clear over said gap on their normal path, and (ii) a second collecting section extending distinctly apart from said first collecting section and adapted to receive articles deflected away from said normal path across said gap,
 wherein the improvement comprises:
  a physical surface connected to the end of said delivering section and slanting towards said second collecting section, and
  intermittent pneumatically-operating nozzle means positioned at the same side as said delivering section and opening closely adjacent to the con- nection thereof with said slanting physical surface, said nozzle means being oriented generally in the direction of motion of the articles on said normal path thereof, whereby said slanting physical surface acts as a selectively controlled deflecting edge for swinging an article arriving from said delivering section, substantially about said connection, due to vacuum exerted thereon by jet action of said nozzle means when operated, in the space bounded by the article to be deflected and by said physical surface.

2. Device as claimed in claim 1, wherein said connection between said slanting physical surface and said delivering end section comprises a relatively sharp edge which substantiates the virtual swinging axis of the articles to be deflected.

3. Device as claimed in claim 2, wherein said intermittent pneumatically-operated nozzle means open beyond said relatively sharp edge to deliver pressure fluid beneath the articles to be deflected.

4. Device as claimed in claim 3, wherein said nozzle means is oriented in a direction which is close to parallel with said delivering end section and therefore at a substantial angle to said slanting physical surface.

5. Device as claimed in claim 1, wherein said first collecting section comprises a fore part which tapers towards said delivering end section extending generally level therewith and presents a ramp configuration adapted to ricochet articles impinging it, said tapering fore part having the general shape of a pyramid with rounded edges and blunted vertex.

6. Device as claimed in claim 5, wherein said pyramid presents a face which is generally in extension of said delivering end section though at a slight slant towards said slanting physical surface.

* * * * *